Schmadel & Lieb,
Caster.
No. 3487. Reissued June 8. 1869.
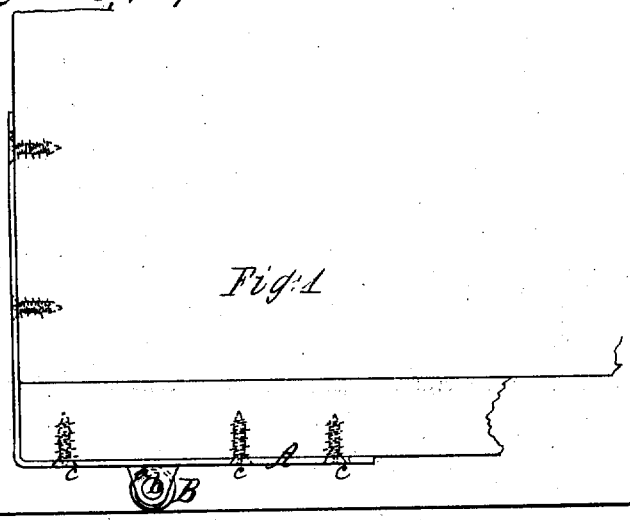
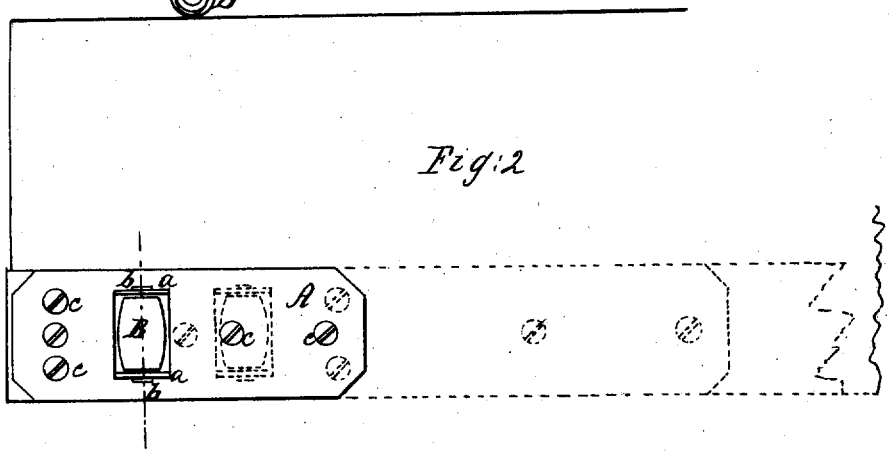
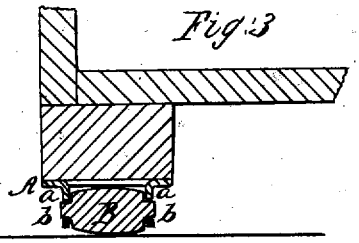
Witnesses
Wm. F. McNamara
C. L. Topliff
Inventors
Johann Schmadel
John A. Lieb
N. PETERS, PHOTO-LITHOGRAPHER, WASHINGTON, D. C.

UNITED STATES PATENT OFFICE.

JOHN A. LIEB, OF NEWARK, NEW JERSEY, FOR HIMSELF AND ASSIGNEE OF JOHN SCHMADEL.

IMPROVED CASTER FOR TRUNKS.

Specification forming part of Letters Patent No. 48,214, dated June 13, 1865; Reissue No. 3,487, dated June 8, 1869.

*To all whom it may concern:*

Be it known that JOHN SCHMADEL and JOHN A. LIEB, of Newark, in the county of Essex, State of New Jersey, did invent a new and Improved Roller for Trunks; and I do hereby declare that the following is a full, clear, and exact description thereof, which will enable those skilled in the art to make and use the same, reference being had to the accompanying drawings, forming part of this specification, in which drawings—

Figure 1 represents a side elevation of this invention. Fig. 2 is an inverted plan or bottom view of the same, showing its application to the corner of a trunk in black outlines and its application as a mere bottom roller in red outlines. Fig. 3 is a transverse section of the same.

Similar letters indicate corresponding parts.

This invention relates to rollers for trunks and other purposes.

The letter A represents a plate made of sheet metal, hoop-iron, or other flexible material, and provided with lugs or ears *a*, which are punched out and turned up in the desired position, so that they can be sprung apart to receive the roller.

The roller B is either made solid with its gudgeons *b*, as shown in Fig. 3 of the drawings, and in that case the lugs have to be sprung apart in order to introduce the same, or it may be mounted in the ordinary manner on an axle passing clear through it and through the lugs. The former method, however, is preferable, since it allows of making the rollers with less labor and loss of time than the latter method, where the rollers have to be drilled clear through.

The plate A is provided with a series of countersunk holes, *c*, to admit screws, by means of which it is secured to a trunk or other article. If the roller is to be used as a simple bottom roller, the plate is attached as shown in red outlines in Fig. 2; but if the roller is to be used as a corner roller, the plate is secured to the cleat on the bottom of the trunk, and then turned up over the corner and secured to the side of the trunk, as shown in black outlines in Figs. 1 and 2. The plate can be bent up during the operation of securing it to the trunk, and it can therefore be applied in any desired position, and be accommodated to trunks of different sizes or having cleats of different thicknesses. If desired, it may also be applied in a reverse position from that shown in the drawings, so that the lugs and a portion of the roller shall be received or confined in a mortise to be made for that purpose in the cleat or bottom of the trunk.

The plate A can be made light, and roller-mountings for trunks can thus be produced at a much smaller expense than those in which the rollers are mounted in corners made of cast-iron.

I am aware that a roller-bracket for trunks has before been made of two rigid plates hinged together. Such a construction is not here claimed.

This invention permits the application or location of the roller at any distance from the corner of the trunk or article without regard to the length of the plate, and also admits of springing the ears apart to receive the gudgeons or journals of the rollers when they are made solid with the rollers.

I am aware that it is not new to turn up lugs from the sides of the flexible plate; nor is the peculiar form of my invention new in itself; but I save metal and produce a strong bearing.

What is claimed as new, and is desired to secure and protect by Letters Patent, is—

In a caster consisting of a flexible plate and a roller, striking up lugs or ears for the roller-journal from inside of the flexible plate, substantially as described.

This specification signed by me this 8th day of February, 1869.

JOHN A. LIEB.

Witnesses:

W. HAUFF,

ERNEST F. KASTENHUBER.